UNITED STATES PATENT OFFICE.

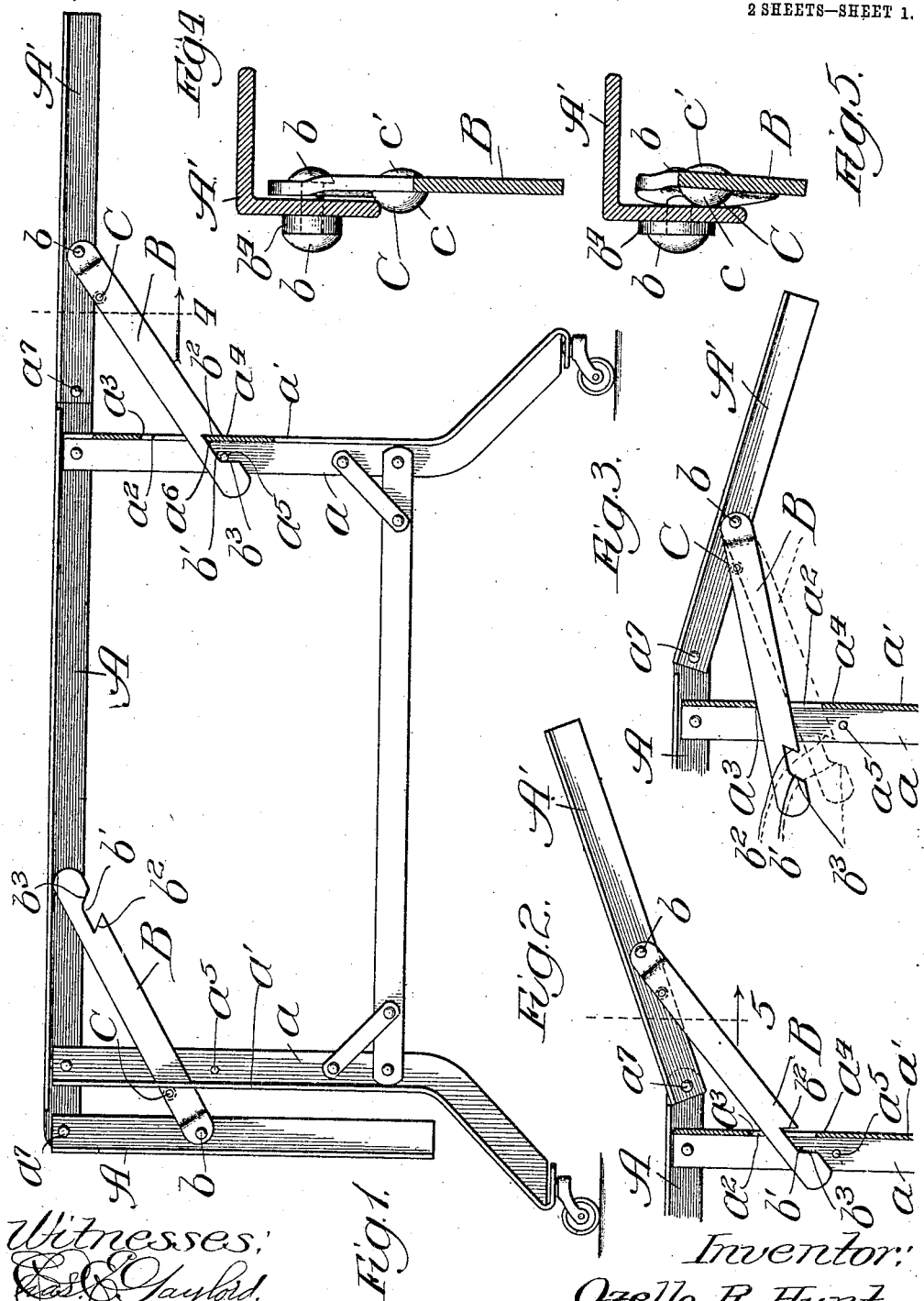

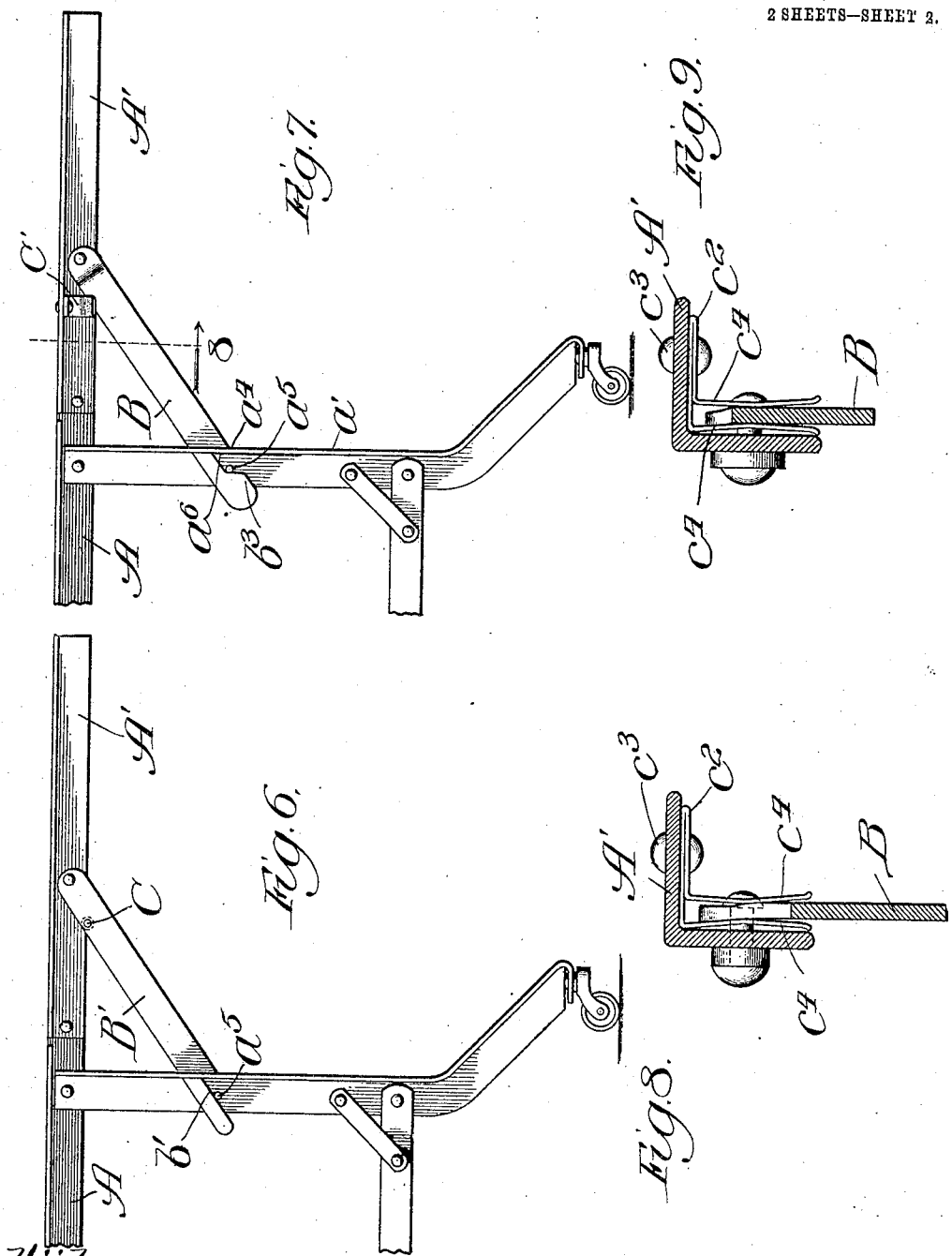

OZELLO R. HUNT, OF KENOSHA, WISCONSIN, ASSIGNOR TO THE SIMMONS MANUFACTURING COMPANY, OF KENOSHA, WISCONSIN, A CORPORATION OF WISCONSIN.

LEAF-SUPPORT.

No. 849,736.  Specification of Letters Patent.  Patented April 9, 1907.

Application filed November 10, 1906. Serial No. 342,811.

*To all whom it may concern:*

Be it known that I, OZELLO R. HUNT, a citizen of the United States, residing at Kenosha, in the county of Kenosha and State of Wisconsin, have invented a new and useful Improvement in Leaf-Supports, of which the following is a specification.

My invention relates particularly to leaf-supports for use in connection with couches and other articles of furniture.

The invention is particularly useful for supporting the swinging leaf or wing of a couch in a horizontal position.

My primary object is to provide an improved automatically-releasing leaf-support whereby the automatical release of the leaf-support may be more easily and certainly effected than by means of known construction.

The invention is illustrated in its preferred embodiment in the accompanying drawings, in which—

Figure 1 represents an inner elevational view of the end standard of a couch provided with swinging leaves or wings equipped with my improved leaf-supporting device, one of the leaves being shown in the extended position and one of the uprights of the end standard being shown in section; Fig. 2, a broken sectional view showing the leaf and its supporting-link secured in fixed relation to each other during the releasing operation; Fig. 3, a similar view showing the leaf during its descent from the horizontal position, during which descent the link is freed from its binding engagement with the leaf to enable the link to move freely on its pivot in assuming a locking position when the leaf is again raised to a horizontal position; Fig. 4, an enlarged section taken as indicated at line 4 of Fig. 1; Fig. 5, a similar section taken as indicated at line 5 of Fig. 2; Fig. 6, a broken elevational view showing a modification of the locking end of the leaf-supporting link; Fig. 7, a similar view showing a modification of the link-engaging means with which the leaf is equipped; Fig. 8, a section taken as indicated at line 8 of Fig. 7, and Fig. 9 a similar section showing the link in its elevated position ready to clear the locking-shoulder with which the end standard is provided.

Referring to Figs. 1 to 5, inclusive, A represents an end standard of a couch; A', swinging leaves or wings pivotally connected with said end standard; B, leaf-supporting links pivotally connected with the leaves A', and C means for causing the leaf-supporting links to become automatically secured at a given angle with relation to the leaves when the latter are raised to an abnormally high position to enable a release to be effected. The end standard is provided with uprights $a$, which may comprise angle-bars having flanges $a'$ parallel with the sides of the couch. Each flange $a'$ is provided with a slot $a^2$, whose upper end affords a cam-shoulder $a^3$. The outer margin of the flange $a'$, adjacent to the lower end of the slot $a^2$, affords a locking-shoulder $a^4$. The flange of the standard A, which is parallel with the end of the couch, is equipped at its inner surface with a stud $a^5$, which serves as a cam for lifting the free end of the leaf-supporting link when the leaf is raised above the horizontal position. If desired, the stud $a^5$ may be omitted and the surface $a^6$ of the flange $a'$ may be depended upon to perform a similar function. Each leaf A' is connected by a pivot $a^7$ with the end standard. Each leaf-supporting link B is connected with the corresponding leaf by a pivot $b$, and the lower edge of each link is provided near the free end of the link with a notch $b'$, affording a locking-shoulder $b^2$, adapted to engage the locking-shoulder $a^4$ of the standard, and a cam $b^3$, adapted to coact with the cam-stud $a^5$. The connection at the pivot $b$ is free normally, so that the link can turn freely on its pivot to enable the locking function to be performed. The pivot may comprise a double-headed rivet of greater length than the thickness of the metal parts which it connects, and a yielding washer $b^4$ of rubber or other material may be employed, if desired. The means C for causing the leaf-supporting link to become bindingly engaged with the leaf when the leaf is raised above the horizontal position may comprise a rivet extending through the link near its upper edge close to the pivot $b$, said rivet having a curved head $c$ at the outer surface of the link and an inner head formed by upsetting the extremity of the shank after the insertion of the rivet through the perforation provided for this purpose in the link. In the normal position of extension of the leaf A' the head $c$ of the rivet lies adjacent to the lower edge of the vertical flange of the angle-bar constituting the wing A'.

From the foregoing description it will be understood that when the leaf A' is swung to an abnormally high position the cam $b^3$ rides upon the cam $a^5$, thereby decreasing the size of the acute angle formed between the link B and the member A' and forcing the head $c$ of the rivet carried by the link to ride upon the inner surface of the vertical flange of the member A', so that the link becomes clampingly or bindingly engaged with the member A'. Upon lowering the leaf from its position of extreme elevation, therefore, the link is held in fixed relation to the member A', as shown in Fig. 2, and caused to clear the locking-shoulder $a^4$, the upper edge of the link afterward engaging the upper end of the slot $a^2$ and causing the rivet C to become freed from engagement with the vertical flange of the member A', whereby the link finally drops to the position indicated by dotted lines in Fig. 3, ready to perform the locking function, when the leaf is again elevated to the horizontal position. It will be observed that the construction provides a positive means whereby the leaf-supporting link is carried bodily by the leaf in passing the locking-shoulder $a^4$, so that it is a matter of no consequence whether the leaf be dropped suddenly or lowered gradually. In other words, it is unnecessary to depend upon the inertia of the link to carry it over the locking-shoulder on the standard, so that a person operating the device need give but little heed to the manner of operation.

The construction indicated in Fig. 6 is similar to the construction already described, and the parts are similarly lettered. The leaf-supporting link is somewhat different, however, and is designated B'. In this construction the cam $b^3$ is reduced by widening the notch or slot $b'$, so that it extends to the extremity of the link. The upper surface of the notch therefore becomes the cam-surface which rides upon the stud $a^5$.

The construction shown in Figs. 7, 8, and 9 is similar to the construction already described, and the parts are similarly lettered, except as to details which will be indicated. In this connection the rivet C for effecting binding engagement between the leaf-supporting link and the leaf is dispensed with and a spring C' is applied to the leaf and serves to clampingly engage the leaf-supporting link when the leaf is raised to its upper limit of movement. The spring preferably comprises a horizontal shank $c^2$, connected with the horizontal flange of the member A' by means of a rivet $c^3$, and depending slightly-diverging members $c^4$, adapted to engage the link B on opposite sides and clampingly hold the link while its locking-shoulder is being carried over the locking-shoulder $a^4$ of the standard.

In all of the constructions, it will be observed, the free extremity of the leaf-supporting link acts as a cam serving to turn the leaf-supporting link with relation to the leaf when the leaf is raised above the horizontal position. The use of the stud $a^5$ instead of the flange $a'$ of the upright of the standard is advantageous, since it renders it possible to effect binding engagement between the link and the leaf by a slight movement of the leaf above the horizontal position. However, the use of the stud involves some additional expense and, if desired, the stud may be omitted, in which case the inner extremity of the link will ride either upon the vertical surface $a^6$ of the flange $a'$ or on the bottom of the slot $a^2$, depending upon whether the enlargement at the end of the link is employed, as shown in most of the figures of the drawings, or is omitted, as shown in Fig. 6 of the drawings.

Obviously the gist of the invention lies in the provision of means for effecting such engagement between the link and the member with which it is pivotally connected as will cause the locking-shoulder of the link to clear the coacting locking-shoulder, and as far as the specific arrangements shown are concerned this is equivalent to stating that when the leaf-supporting link is pivotally connected with the leaf the gist of the invention lies in providing coacting means whereby the link shall become connected with the leaf in such manner that the leaf will serve to carry the link bodily while the locking-shoulder of the link passes over the locking-shoulder of the standard.

The foregoing detailed description has been given for clearness of understanding only, and no undue limitation is to be understood therefrom.

What I regard as new, and desire to secure by Letters Patent, is—

1. The combination with a frame provided with a locking-shoulder, and a leaf pivotally connected with said frame, of a link pivotally connected with said leaf and equipped with a locking-shoulder and with a cam at its free end, and means located near the pivot of said link serving, when the leaf is moved to an abnormal position, to secure the link temporarily at a fixed angular relation to the leaf, whereby the link is carried bodily by the leaf and its locking-shoulder caused to clear the locking-shoulder of the frame in the releasing operation.

2. The combination with a frame provided with a locking-shoulder and with a cam-shoulder, and a leaf member pivotally connected with said frame, of a link member pivotally connected with said leaf member and equipped with a locking-shoulder coacting with said first-named locking-shoulder and with a cam serving to turn the link with relation to the leaf member when the leaf member is raised to an abnormally high position, and means carried by one of said members near the pivot of the link member and serving to engage the other member and thereby secure the members together at a fixed angular relationship, whereby the leaf member serves to carry the link member bodily and cause the locking-shoulder of the link member to clear the coacting locking-shoulder of the frame in the releasing operation, the cam-shoulder on said frame serving to disengage the link member from its fixed relation to the leaf member during the descent of the leaf member.

3. The combination with a frame provided with a locking-shoulder and with two cam-shoulders, and a leaf member pivotally connected with said frame, of a link member pivotally connected with said leaf member and provided with a locking-shoulder and with a cam at its free extremity, said cam serving, when the leaf member is raised to an abnormally high position, to turn the link member with relation to the leaf member, and a stud connected with one of said members near the pivot of the link member and serving to bindingly engage the other member, whereby the link member is caused to be carried bodily by the leaf member so that the locking-shoulder of the link member will clear the locking-shoulder of the frame in the releasing operation, said link member engaging one of the cam-shoulders of the frame during the descent of the leaf member, thereby to free the link member from binding engagement with the leaf member.

4. The combination with a frame having an upright provided with a slot, at the lower end of which is a locking-shoulder and at the upper end of which is a cam-shoulder, a stud within the frame at a distance from said slot and serving as a cam-shoulder, and a leaf member pivotally connected with said frame, of a link member pivotally connected with said leaf member and provided with a locking-shoulder and a cam extremity adapted to ride upon the cam-shoulder afforded by said stud, and means connected with one of said members near the pivot of the link member serving to secure the link member at a fixed angular relationship to the leaf member, the link member engaging the cam-shoulder at the upper end of said slot when the leaf member is dropped, thereby freeing the link member from its fixed relationship to the leaf member to enable the link member to perform again its locking function when the leaf member is again raised.

5. The combination with a frame provided with a locking-shoulder and a leaf pivotally connected with said frame, of a link pivotally connected with said leaf and provided with a locking-shoulder, and a stud carried by said link near the pivot thereof, said stud adapted to engage the leaf and secure the link at a fixed angular relationship to the leaf when the leaf is raised to an abnormally high position, whereby the leaf serves bodily to carry the link and cause its locking-shoulder to clear the locking-shoulder of the frame during the descent of the leaf.

OZELLO R. HUNT.

In presence of—
A. U. THORIEN,
C. W. WASHBURNE